United States Patent [19]

Ortman

[11] Patent Number: 4,762,205
[45] Date of Patent: Aug. 9, 1988

[54] FLIGHT CONTROL SURFACE ACTUATOR FOR AIRCRAFT INCLUDING REMOTE BRAKING FAILURE DETECTION

[75] Inventor: Michael J. Ortman, Maplewood, N.J.

[73] Assignee: Simmonds Precision, Tarrytown, N.Y.

[21] Appl. No.: 51,594

[22] Filed: May 20, 1987

[51] Int. Cl.[4] .................. F16D 55/02; F16D 63/00; G01M 13/02; B64C 5/00

[52] U.S. Cl. .................. 188/71.2; 73/162; 73/DIG. 3; 188/83; 188/82.5; 244/75 R; 338/32 H; 340/52 B

[58] Field of Search .............. 188/1.11, 71.4, 73.2, 188/83, 82.1, 82.3, 82.7, 82.77, 82.9, 171, 173, 82.2, 180, 187, 106 P, 71.2, 82.5; 192/45.1; 244/75 R, 76 R, 76 A; 73/DIG. 3, 121, 129, 162; 338/32 M; 340/52 B

[56] References Cited

U.S. PATENT DOCUMENTS

| | | | |
|---|---|---|---|
| 2,134,420 | 10/1938 | Smith | 188/82.2 |
| 2,560,015 | 7/1951 | Waldron | 188/83 X |
| 2,654,570 | 10/1953 | Voda | 188/82.7 X |
| 3,013,638 | 12/1961 | Satrum | 188/79.5 K |
| 3,392,805 | 7/1968 | Kreitner | 188/71.4 |
| 3,802,257 | 4/1974 | Jorenda et al. | 73/129 |
| 3,807,535 | 4/1974 | Shimada | 188/79.5 K |
| 3,926,284 | 12/1975 | Notario | 188/196 BA |
| 4,110,676 | 8/1978 | Edick et al. | 322/31 |
| 4,507,976 | 4/1985 | Banko | 73/861.54 |
| 4,569,233 | 2/1986 | Rosaen | 73/861.42 |
| 4,578,993 | 4/1986 | Burandt | 244/75 R X |
| 4,603,594 | 8/1986 | Grimm | 188/106 P X |

FOREIGN PATENT DOCUMENTS

| | | | |
|---|---|---|---|
| 2031356 | 4/1980 | United Kingdom | 244/75 R |
| 0805099 | 2/1981 | U.S.S.R. | 73/162 |

Primary Examiner—Andres Kashnikow
Assistant Examiner—Robert J. Oberleitner
Attorney, Agent, or Firm—Harry Williams

[57] ABSTRACT

An actuator system for positioning a flight control surface on an aircraft in which a primary braking device provides a continuous braking action to the actuator screw shaft by means of a load bearing disc brake wheel and a pair of rachet wheels contiguous therewith, the torque between the disc brake wheel and the rachet wheel (which ever wheel is being racheted by the load bearing disc) is proportional to the load on the screw shaft (and hence the actuator for the flight control surface). A Hall-effect device is mounted above the pawls associated with the rachet wheels for measuring the movement of the pawls in a closed loop circuit for the purpose of determining not only a faultlessly running braking condition but also to indicate whether a faulty condition exists, as well as what kind of fault is being detected.

11 Claims, 2 Drawing Sheets

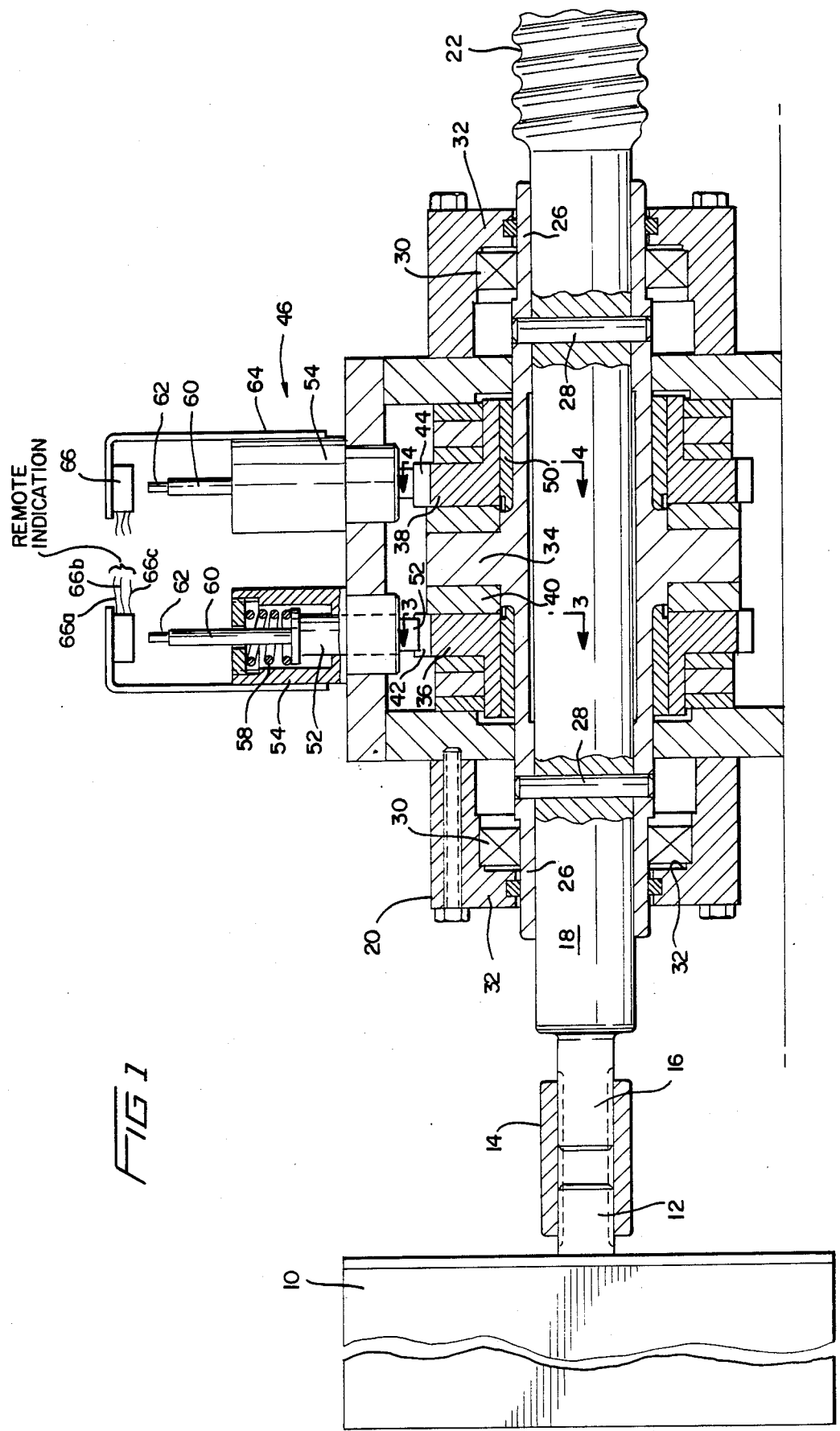

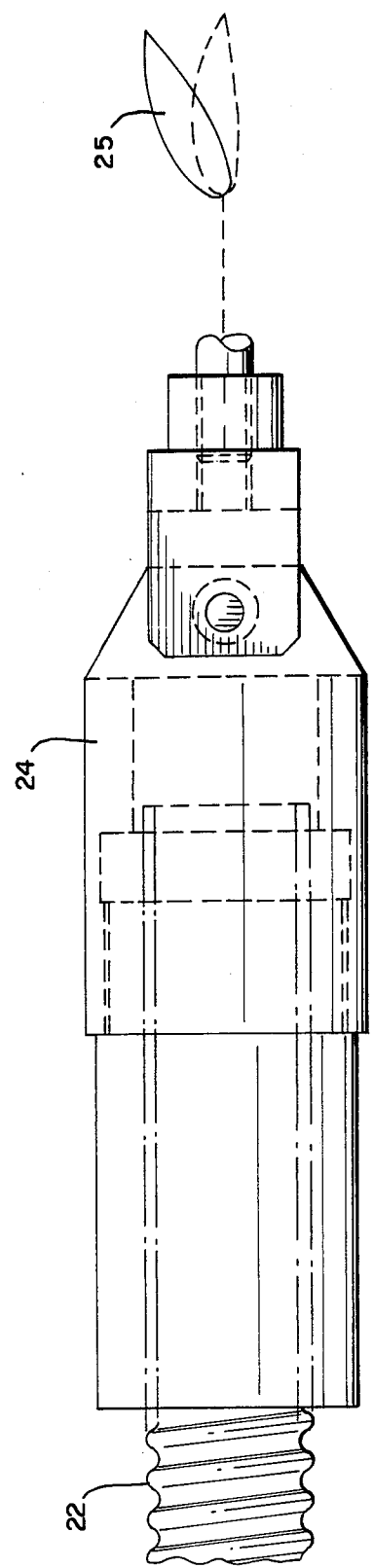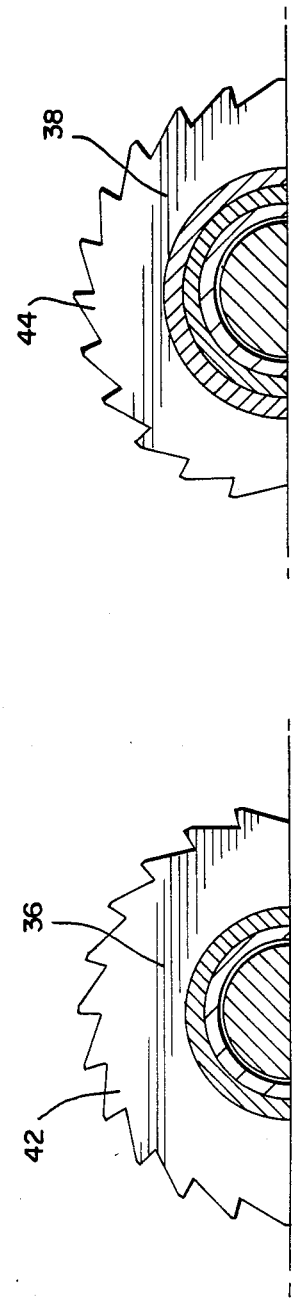

4,762,205

FLIGHT CONTROL SURFACE ACTUATOR FOR AIRCRAFT INCLUDING REMOTE BRAKING FAILURE DETECTION

FIELD OF THE INVENTION

This invention relates to the remote detection of failure in the primary mechanical braking system of an actuator mechanism for flight control surfaces on an aircraft.

BACKGROUND OF THE INVENTION

Such actuator systems usually consist of a motor having a rotary output whose motion is translated by means of a ball and screw mechanism to the reciprocating action of an actuating element. The latter element is normally connected to a flight control surface on an aircraft to thereby position the same with respect to an airfoil member.

In many aircraft the control of such surfaces as flaps, spoilers, empennages and rudder assemblies are also assisted by the use of braking devices. For example, one known embodiment uses a pair of rachet wheels and pawl devices in conjunction with a disc brake or load bearing wheel member disposed between the rachet wheels and mounted on the ball and screw shaft for rotation therwith. In this arrangement the torque between the disc brake wheel and the rachet wheel (which ever wheel is being racheted by the load bearing wheel) is proportional to the load on the screw shaft (and hence the actuator for the flight control surface), and the rachet wheel is caused to rotate by the frictional engagement between the disc brake wheel and the rachet wheel, thus providing a continuous, load-dependent friction or damping counterforce to the load on the screw shaft. The teeth of each rachet wheel cooperate with a pawl mechanism to allow rotation in one direction only, the teeth of each wheel also being configured oppositely to the teeth of the other wheel so that its respective rotation direction corresponds to the angular direction (forward or reverse) taken by the ball-screw shaft. Consequently, as torque is established between one of the rachet wheels and the disc brake wheel stability is enhanced during movement of the actuator shaft and ultimately the flight control surface, so that fluttering, wobbling, or lost motion is dampened out.

With this arrangement heretofore described, usually some sort of back-up or redundant braking system, such as that described in the U.S. Pat. No. 4,603,594, is available in case of an undetected failure occuring in the primary system. Such detection-free actuator systems usually require, therefore, additional motor and gear train duty cycles and the like, or such other redundant or secondary systems that would normally add to their cost and weight.

SUMMARY OF THE INVENTION

It is a principle and primary object of the present invention to address the aforementioned problems associated with actuator systems in aircraft and to therefore provide a remote detection system for a primary braking system for a ball-screw actuator system that is continuously operable in rotary and reverse rotary movements.

In particular, the present invention makes use of a pawl and rachet anti-torque braking mechanism and a remote failure dectection device associated with the braking system itself. By means of the present invention, various failure modes, such as faulty rachet wheels, teeth, or pawls, or even loss of friction, can be immediately detected, either airborne or on ground, so that immediate corrective measures can be taken—replacement of the faulty parts if on the ground, or alternative operating procedures introduced if airborne. In either case, the need for redundant materials and secondary braking systems, including secondary electro-mechanical braking systems, can be avoided.

In accordance with the principles of the invention, a Hall-effect device is mounted above the pawls associated with the rachet wheels. By using a Hall-effect device for measuring the movement of the pawls in response to rotation of the rachet wheels in a closed loop circuit, an output signal can be generated which in turn can be suitably processed and compared with a reference or threshold value in order to determine not only a faultlessly running primary brake system as set forth in the present invention, but also to indicate whether a faulty condition exists, as well as what kind of fault is being detected.

The invention will be further understood as well as further objects and advantages thereof become more apparent from a reading of the ensuing detailed description taken in conjunction with the drawings.

BRIEF DESCRIPTION OF THE DRAWINGS

FIG. 1 is a schematic illustration, partially in section, of the preferred embodiment of the invention;

FIG. 2 is a schematic illustration showing the actuator assembly connected to a flight control surface;

FIG. 3 is a schematic partial section taken along the lines 3—3 of FIG. 1; and

FIG. 4 is a schematic partial section taken along the lines 4—4 of FIG. 1.

DETAILED DESCRIPTION OF THE PREFERRED EMBODIMENT

Referring now to FIG. 1, there is shown a motor actuator 10 having a rotary output shaft 12 which is suitably splined by a coupling 14, constructed for that purpose, to a reduced section 16 of a drive shaft 18. While a motor is shown here as the prime mover, it should be understood that a gearing system, not shown, is normally interposed between the shaft 18 and the motor. The shaft 18 extends through a housing structure 20 and exits therefrom in the form of a ball-screw shaft member 22 which is connected by means of a ball-screw adaptor assembly 24 that moves reciprocally in response to rotation of the screw shaft 22, as is well known. The adaptor assembly is further connected by means of a suitable linkage mechanism, not shown, to a flight control surface 25, as best shown in FIG. 2.

Surrounding the middle portion of the shaft 18 and disposed within the interior of the housing structure 20, is a sleeve member 26 which is secured to the shaft by pins 28 so as to rotate therewith. Bearing members 30 provided at each end of the sleeve 26 and supported in respective and opposing ends 32 of the housing 22 rotatatably support the sleeve and shaft assembly for rotation within the housing. At the middle portion of the sleeve and integral therewith is a disc brake wheel or load plate assembly wheel 34 sandwiched between a left rachet wheel 36, as viewed from FIG. 1 and a right rachet wheel 38. A clutch braking surface 40 is disposed between the adjacent surfaces of the respective rachet wheels and both sides of the disc brake wheel 34. The braking material may be composed of an aluminum bronze composition, or some such other suitable metal or high resistant material, for example, and is affixed to that side of a respective rachet wheel which faces the disc brake 34.

As best shown in FIGS. 3 and 4, each of the rachet wheels is provided with rachet teeth 42 and 44, respectively, that cooperate with respective pawl mechanisms 46, to be more fully described below. The rachet wheels 36 and 38 are supported by bushing members 50 (see FIG. 1) so that they are freely rotatable about the sleeve member 26.

The pawl mechanisms 46 are identical, and therefore like numbers are provided for like parts. Each mechanism is provided with a spring biased pawl 52, resiliently and slidably supported in a cylindrical housing 54 and urged in a downward, tooth-engaging direction by suitable coil spring members 58. Affixed to the top of the pawl 52 and extending through an appropriate opening in the top of the housing 54, is an extension rod member 60 having affixed at its upper surface a magnet member 62, which may be composed of samarium cobalt. Also supported on the housing 54 by suitable bracket means 64 is a Hall-effect transducer 66 which responds electrically, in a known manner, to the varying position of the magnet with respect to the fixed position of the transducer member 66. The Hall-effect transducer 66 may be mounted on the bracket 64 by an epoxy adhesive or other bonding agent. One of the transducers 66 is shown to have three leads, 66a, 66b and 66c, one of the leads being a voltage input, another being a voltage output, and the third providing a reference potential for the voltage input and the voltage output. These leads will connect to remotely positioned signal processing circuits, now shown. Naturally, the other transducer 66 shown in FIG. 1 is also provided with the circuitry just described. A suitable Hall-effect transducer is a type 9SS series linear output Hall-effect transducer marketed by the Microswitch Division of Honeywell, Inc. Reference can also be had to U.S. Pat. Nos. 4,569,233 and 4,507,976, which patents show, respectively, two different kinds of structures of Hall-effect devices.

It will be seen from FIGS. 3 and 4, in particular, that the direction of the teeth 42 on rachet wheel 36 are opposed to the direction of the teeth 44 on rachet wheel 38, so that the respective pawl member 52 which bears against the teeth of one wheel allows that wheel to rotate in one direction but acts as a stop to its rotation in the opposite direction. In this way when the shaft 18 is rotated by the motor 10 in one direction, one of the rachet wheels, rachet wheel 36, say, will slip free of the pawl and rotate with the shaft according to the torque created by the friction between the braking surface 40 on the rachet wheel 36 and the disc brake wheel 34, providing, therefore, a damping force to the applied external load; whereas the other rachet wheel 38, whose teeth 44 are oppositly disposed to the teeth on the first rachet wheel, will be stopped from rotation by one of the pawls 52 associated with it. This last condition will cause the braking surface 40 associated with that wheel to slip past the disc brake wheel in a relatively torque-free condition owing to such slippage, for that given angular direction.

If the motor 10 is reversed and the shaft 18 is now caused to rotate in an opposite direction, naturally the rachet wheels 36, 38 will reverse their functions, or more particularly, rachet wheel 36 will now slip past the brake disc wheel by virtue of its being held in place by its associated pawl 52, while rachet wheel 38 will rotate with the shaft (the teeth 44 slipping past their associated pawl 52) according to the torque created between the braking surface 40 and the brake disc 34. It will be understood, as well, that the torque established between the braking surface 40 and the brake disc 34 will vary as the load on the shaft 18 varies, so that as the load on the shaft increases so will the torque on the braking disc. As torque is established between one of the rachet wheels and the braking disc, stability is enhanced during movement of the actuator shaft and ultimately the flight control surface 25, so that fluttering, wobbling, or lost motion is completely dampened out.

By means of the Hall-effect devices associated with the pawl mechanisms 46, an output signal can be generated which varies as the position of the magnet members 62 vary with respect to the transducer members 66. Thus, various voltage-comparison steps can be made, as is well known in the signal processing art, for the purpose of providing voltage level output displays which will enable one to interpret the output data to determine remotely the operating condition of the braking system. For example, if the braking system is operating correctly then an output signal having a known sinusoidal wave-form pattern will indicate that the rachet teeth are all in place and that they are rotating in a prescribed manner that is dependent upon the torque created between the disc brake wheel and the braking surface of the moving rachet wheel, that is, which ever rachet wheel is in motion as opposed to the other which will be stopped by its associated pawl. Any deviation from a predetermined waveform pattern will indicate that either a rachet wheel or its teeth are faulty, that some teeth may be missing, or in the case of a signal whose output is at a constant amplitude or level, that a rachet wheel is in fact stripped, or a pawl member is completey stripped.

The foregoing relates to a preferred embodiment of the invention, it being understood that other embodiments and variants thereof are possible within the spirit and scope of the invention, the latter being defined by the appended claims.

What is claimed and desired to be secured by Letters Patent of the United States is:

1. An actuator system for controlling the position of a flight control surface on an aircraft, comprising
  a prime mover means for rotating an actuator shaft in opposite angular directions for positioning said flight control surface,
  a braking device rotatable about said actuator shaft and having a braking surface means thereon,
  a load bearing means fixed to said shaft and rotatable therewith,
  said braking surface means of said braking device always being contiguous with said load bearing means,
  a pawl means for releaseably engaging said braking device to thereby allow said braking device to rotate with said shaft in one of said angular directions and to be fixed with respect to said shaft in the other of said angular directions, whereby said load bearing means is constantly braked by said braking device regardless of the angular direction said shaft is being rotated, and
  a fault detection device for said braking device disposed in proximity thereto and having an electrical circuit means for providing a remote indication of the continuous operation of said braking device.

2. An actuator system according to claim 1, wherein said braking device comprises a pair of ratchet wheels, and said load bearing means comprises a load disc coaxial with and disposed between each of said rachet wheels, and said braking surface means being located between each of said rachet wheels and said load disc.

3. An actuator system according to claim 2, wherein said pawl means comprise a pair of pawl mechanisms for releaseably engaging said pair of rachet wheels.

4. An actuator system according to claim 2, wherein the teeth of one of said ratchet wheels is oppositely configured to the teeth of the other of said rachet wheels.

5. An actuator system for controlling the position of a flight control surface on an aircraft, comprising
a prime mover means for rotating an actuator shaft in opposite angular directions for positioning said flight control surface,
a braking device for said actuator shaft having a first means integral with said actuator shaft and rotatable therewith, a second means independently rotatable with respect to said actuator shaft, and a third means disposed on said second means which is always contiguous with a portion of said first means,
a pawl means for releaseably engaging said second means to thereby allow said second means to rotate with said shaft in one of said angular directions and to be fixed with respect to said shaft in the other of said angular directions, whereby said first means is constantly braked by said second means regardless of the angular direction said shaft is being rotated, and
a fault detection means for said braking device disposed in proximity thereto and having an electrical circuit means for providing a remote indication of the operation of said device.

6. An actuator system according to claim 5, wherein said fault detection means comprises a Hall-effect device mounted in proximity to said second means.

7. An actuator system according to claim 6, wherein said Hall-effect device comprise a magnet means disposed on a portion of said pawl means and a transducer means fixedly positioned and spaced from said magnet means.

8. An actuator system according to claim 7, wherein said circuit means both introduces and removes a voltage potential from said transducer means.

9. An actuator system according to claim 5, wherein said first means comprises a load bearing disc, said second means comprises a pair of rachet wheels coaxial with said load bearing disc and between which is disposed said load bearing disc, and said third means comprises a braking surface means being located between each of said rachet wheels and said load bearing disc.

10. An actuator system according to claim 9, wherein said pawl means comprise a pair of pawl mechanisms for releaseably engaging said pair of rachet wheels.

11. An actuator system for controlling the position of a flight control surface on an aircraft, comprising
a prime mover means for rotating a ball-screw actuator shaft in opposite angular directions for positioning said flight control surface,
a braking device for said actuator shaft having a load bearing disc integral with said actuator shaft and rotatable therewith and a rachet means independently rotatable with respect to said actuator shaft having a braking surface means thereon which is always contiguous with a substantial portion of said load bearing disc, and
a pawl means for releaseably engaging said rachet means to thereby allow said rachet means to rotate with said shaft in one of said angular directions and to be fixed with respect to said shaft in the other of said angular directions, whereby said load disc is constantly braked by said rachet means regardless of the angular direction said shaft is being rotated, and
a Hall-effect fault detecting means connected to said pawl means for continuously measuring the operating condition of said pawl means and said rachet means.

* * * * *

UNITED STATES PATENT AND TRADEMARK OFFICE
CERTIFICATE OF CORRECTION

PATENT NO. : 4,762,205

DATED : August 9, 1988

INVENTOR(S) : Michael J. Ortman

It is certified that error appears in the above-identified patent and that said Letters Patent is hereby corrected as shown below:

Column 1, Line 27

"therwith" should read --therewith--.

Signed and Sealed this

Thirtieth Day of May, 1989

Attest:

DONALD J. QUIGG

Attesting Officer

Commissioner of Patents and Trademarks